June 15, 1943. H. R. HIGLEY 2,321,915
GLAREMETER
Filed Feb. 20, 1942 2 Sheets-Sheet 1
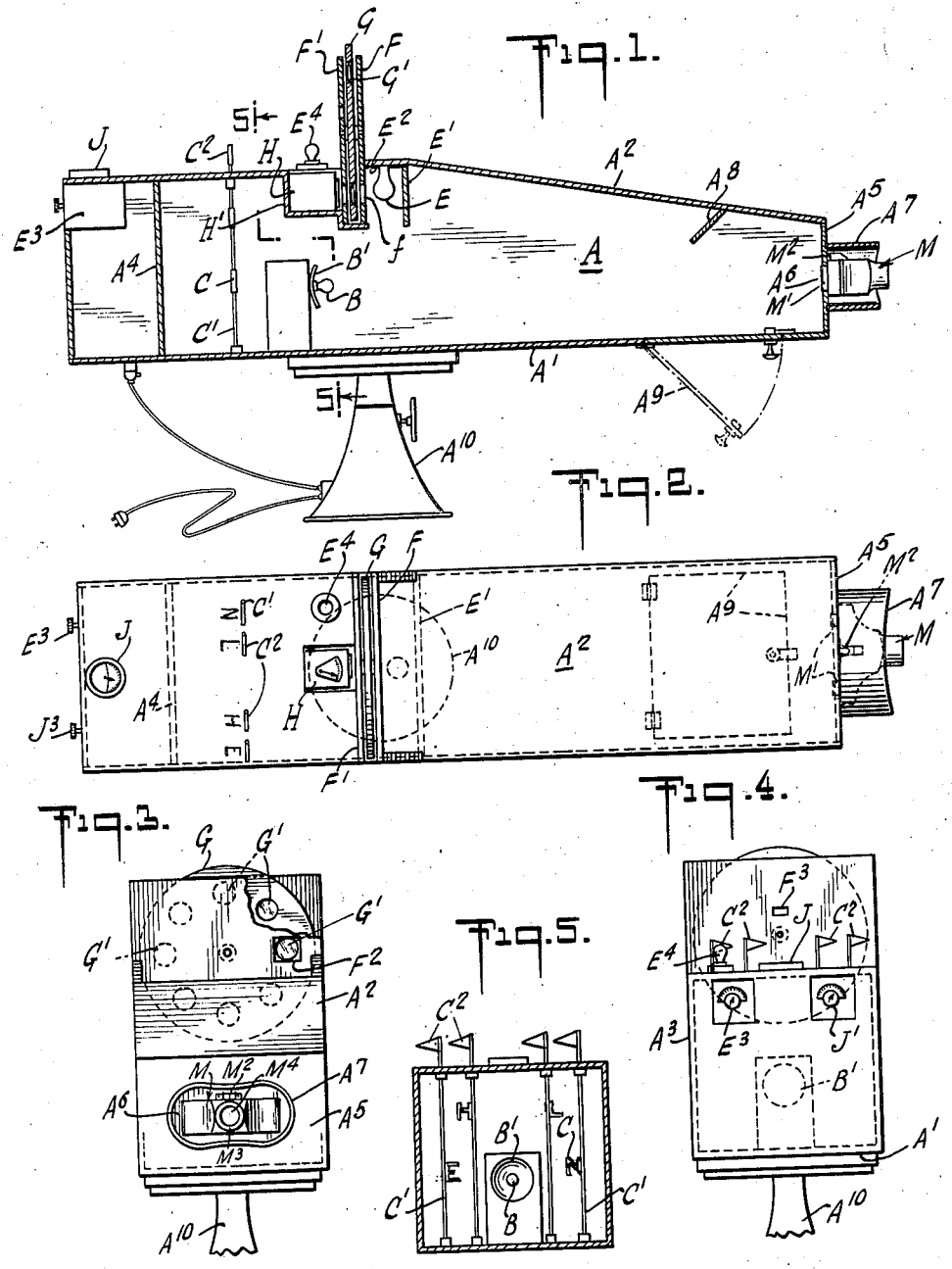
INVENTOR
HENRY R. HIGLEY
BY
Morrison, Kennedy & Campbell
ATTORNEYS June 15, 1943.　　H. R. HIGLEY　　2,321,915
GLAREMETER
Filed Feb. 20, 1942　　2 Sheets-Sheet 2

INVENTOR
HENRY R. HIGLEY
BY
Morrison, Kennedy & Campbell
ATTORNEYS.

Patented June 15, 1943

2,321,915

UNITED STATES PATENT OFFICE 2,321,915

GLARE METER

Henry R. Higley, Pittsfield, Mass.

Application February 20, 1942, Serial No. 431,653

2 Claims. (Cl. 88—20)

This invention relates to an apparatus for determining the sensitiveness of a person to the glare of brilliant light sources and for determining the tint of an eyeglass lens suitable to compensate for such sensitiveness.

Many people are extremely sensitive to the glare of brilliant light sources, as for instance automobile head lights at night; indeed, most people are sensitive to glare at least to a slight extent. It is a fact, however, that it is not the brilliance of the light source per se that causes the difficulty, but rather the contrast between the light source and the surrounding darkness. That this is true is demonstrated by the fact that the same light source during the day would cause no trouble, being almost indistinguishable because of the relatively great illumination surrounding the light source.

It has been found that tinted glasses assist many people afflicted with glare sensitiveness and in my prior Patent No. 2,209,728 there is described an apparatus for scientifically selecting the proper tint of lens for any given person.

The construction and operation of the apparatus described in my prior patent is based upon the phenomenon heretofore alluded to, namely, that the degree to which a person is affected by the brilliance of a light source depends upon the relative illumination in the vicinity immediately surrounding the light source, the source being of seemingly great intensity when there is an absence of illumination surrounding the light source and of relatively lesser intensity as the immediate vicinity is illuminated.

In the apparatus disclosed in my prior patent there is provided a somewhat elongated box-like structure having an aperture at one end through which the subject being examined can look. The box-like structure is constructed so as to exclude all extraneous light and in the direct line of vision of the subject there is provided a dazzle source of light. A second source of light, shielded from the vision of the subject, is caused to illuminate the vicinity surrounding the first source, the second source of light being gradually increased in intensity until objects in the vicinity surrounding the first source of light become visible to the subject undergoing examination because of the light reflected therefrom. The subject thereupon announces the fact that the objects in the vicinity surrounding the dazzle source have become visible. A reading is then taken of the intensity of the second light source through the medium of a light meter, which reading will indicate the extent to which the subject is affected by glare. Now, by inserting differently tinted lenses between the second light source and the light meter, a lens can be selected which will reduce the reading of the light meter to a value which will be normal for the subject undergoing examination. The lens so selected will have the proper tint for that particular subject.

While my prior apparatus has given very satisfactory results, I have found through experience that some subjects have one eye more sensitive to light than the other and that therefore it is advisable, when examining eyes for sensitiveness to glare, to examine not only both eyes simultaneously but each eye separately as well.

Merely to obstruct the vision of one eye while taking a reading with the other eye and then reversing the procedure to obtain a reading for the first eye, will not give accurate results since under those circumstances, the readings for the different eyes would be made from different positions. To make an accurate test for each eye separately so as to be able properly to compare the results, it is essential that the tests for the different eyes be made from exactly the same position. The present improvement enables the eyes separately to be tested in a proper manner. It consists in an attachment for my prior apparatus and which comprises an eyepiece limited for use with one eye only at a time and which is centrally located at the front of the apparatus to insure that the readings for both eyes will be taken from the same position. The attachment is arranged for ready removal so that the eyes may be tested simultaneously as well.

Referring to the drawings:

Fig. 1 is a vertical longitudinal sectional view through apparatus made in accordance with the present invention;

Fig. 2 is a plan view of the apparatus shown in Fig. 1;

Fig. 3 is a right end view of the apparatus shown in Fig. 1;

Fig. 4 is a left end view of the apparatus shown in Fig. 1;

Fig. 5 is a transverse sectional view on line 5—5 of Fig. 1;

Figure 6:
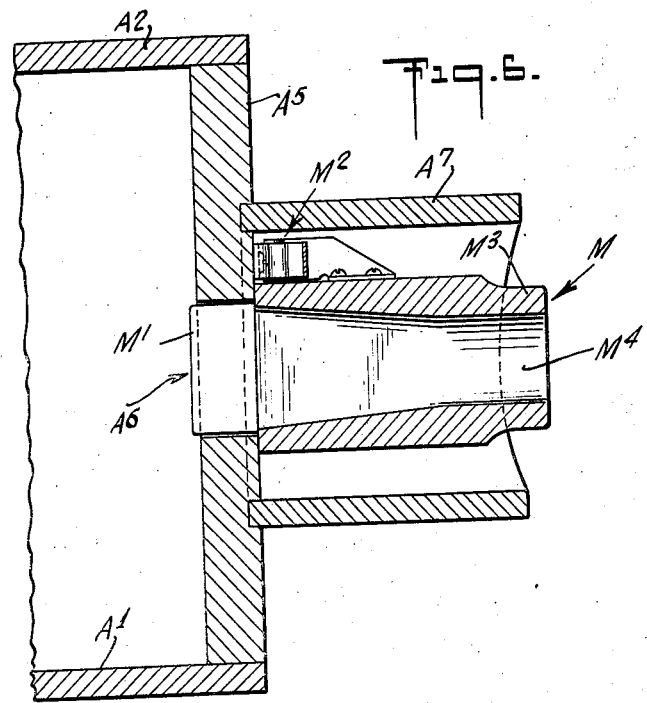
Fig. 6 is a vertical longitudinal sectional view through the front portion of the apparatus and showing the improved eyepiece in place.
Figure 7:
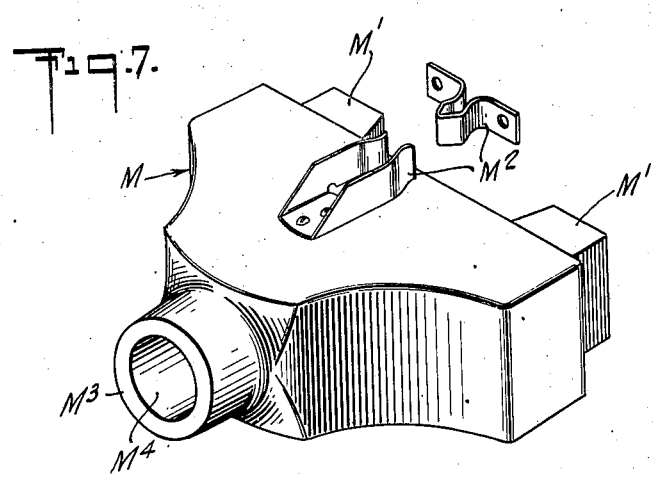
Fig. 7 is a perspective view of the improved eyepiece per se.

As shown in the drawings, the apparatus is formed with a compartment A defined by a bottom $A^1$, a top $A^2$ and side walls $A^3$, a partition $A^4$ near the left or rear end, and a wall $A^5$ at the front end provided with a sight hole or aperture $A^6$ through which the subject being examined can look. The compartment structure is arranged to exclude all extraneous light, while the interior thereof is painted a dull black so as to diminish light reflection from the interior surfaces as much as possible.

In the direct line of vision of the subject and near the rear of the compartment, there is located, on a suitable stand or post, a light B having a reflector $B^1$ adapted to focus substantially all the rays of the light directly into the eyes of the subject.

At the beginning of the test, the vicinity surrounding the light source is totally dark so that objects located therein will be invisible. There are objects located in the vicinity surrounding the dazzle source (see Figs. 1 and 5) consisting of a series of letters C (the particular letters shown being E, H, L, N and which are painted a dull white) mounted upon vertical rods $C^1$ which are individually rotatable so as to bring the letters into a plane at right angles to the line of vision when desired, or into planes parallel with the line of vision so that, even though the vicinity surrounding the dazzle source is illuminated in the manner hereinafter to be described, the letters will still be invisible, being located in their latter positions, behind the rods which themselves are a dull black in color so as to be invisible at all times. The location of the letters on the rods is such that, when they are in the plane at right angles to the line of vision, they will all be equidistant from the light source B.

Near the top of the compartment and located somewhat forwardly of the previously mentioned source of light B, there is provided a second source of light E which, through circuit means not shown, can be turned on gradually so as to illuminate the vicinity surrounding the light source B. This second light source is mounted on the rear face of a depending shield element $E^1$ out of the direct view of the subject and, in order that the rays of said lamp be directed downwardly, there is provided a mirror $E^2$ (Fig. 1) secured to the top of the compartment at the lower face thereof immediately above the light source E.

With the lamp B lit at the outset of the test, but with the compartment otherwise in total darkness, the second mentioned light source E is turned on, so as gradually to illuminate the vicinity surrounding the dazzle source and, when the condition of illumination is such as to render the objects C visible to the subject, such fact is announced to the operator. In other words, when the conditions just mentioned occur, the effect of the glare from the lamp B tending to cause objects in the relatively lesser illuminated surrounding vicinity to be invisible will have been diminished and the amount of field illumination necessary for a lamp of given intensity to produce the condition stated is a measure of the effect of the glare upon the subject under test.

The intensity of illumination necessary to render the objects visible and the proper color tint of lens for the subject undergoing test are determined in the following manner. Just to the rear of the lamp E, there is provided a pair of standards consisting of two parallel flat plates F, $F^1$ built into the structure and extending from a point somewhat below the top $A^2$ of the compartment, but above the light source B to a point considerably above the top $A^2$. Between the standards, there is mounted a rotatable disc G provided with a series of lenses $G^1$, arranged in a circle around the disc and each having a different tint with the exception of one, which is colorless or tintless. The disc G is rotated so as to bring the tintless lens into registry with apertures $f$, $f^1$ in the standards F and $F^1$, respectively, which apertures are located in line with the lamp E and a light meter H arranged in a small compartment $H^1$ built into the top of the main compartment A and immediately to the rear of said standards. The intensity of the light E required to render objects surrounding the dazzle source visible to the subject is now read on the light meter, the light at this time passing through the tintless lens. The reading of the light meter under such conditions will, when compared with a standard reading taken in the same way for a normal subject, give an indication of the effect of glare upon the subject under test. The normal or standard readings vary for different subjects, it having been found by experiment that the older the person the greater is the effect of glare from a brilliant light source. In other words, an adult having normal vision, as regards glare, is more sensitive in this respect than a child of normal vision. It is the normal reading for the age of the person undergoing test that furnishes the standard with which the reading of the light meter is compared.

The proper tint of lens for the subject under test is now determined by rotating the disc G to bring a lens into registry with the apertures $f$, $f^1$ and between the light source E and the light meter H which will reduce the reading of the light meter approximately to the normal or standard for the person undergoing test. The lens selected in this way will have the proper tint for that particular person.

Referring again to the objects or letters E, H, L, N, which are arranged in the vicinity surrounding the dazzle source, it will be recalled that they are capable of being turned out of a plane at right angles to the line of vision so as to be indistinguishable to the subject even though the light conditions be such as would otherwise render them visible. The purpose of this arrangement is to afford a check on the subject, since it is quite obvious that the latter may remember the letters and on a check test announce the appearance thereof before they actually came into full view. Thus, in making the initial test, the operator might have only two letters, say L and E, turned into the visible position when the field is sufficiently illuminated, whereas in a subsequent or check test, different letters, as for instance, N and H could be so located. A proper reading of the subject of the letters as they appear at approximately the same degree of illumination in each test would give an accurate check on the sensitiveness to glare of the subject.

In order to indicate to the operator those letters which are turned into the range of vision, the rods $C^1$ on which the letters are mounted are provided at their upper ends with flat triangular finger pieces $C^2$ extending radially from the rods in the same direction as the letters, so that when a finger piece is located in a plane extending transversely of the apparatus, the corresponding letter will be in a plane extending transversely of the apparatus, whereas when a finger piece is turned through 90° into a plane extending longitudinally of the apparatus, the corresponding letter is in a plane parallel with the line of vision, in which case of course the letter is indistinguishable for reasons heretofore mentioned. Letters corresponding to the letters on the rods are located on top of the apparatus in the vicinity of the respective rods which, in conjunction with the location of the finger pieces, will apprise the operator of the letters that the subject will see when sufficiently illuminated. If desired, suitable stops (not shown) may be used in conjunction with abutments on the rods to limit the turning of the latter in either direction beyond the two positions stated. Thus, when the rod during adjustment is arrested in its movement, the operator will know the object is in the desired position.

A square aperture $F^2$ is provided in the front standard opposite the pitch line of the lenses in order to permit the operator to display to the subject the tint of the lens that has been selected. A white background for the lens at this point will be helpful for this purpose. The operator can identify the lens selected through the medium of a small aperture $F^3$ formed in the rear standard just above the center of the disc (Fig. 4). A lens identifying mark located on the disc will appear through this aperture when the lens to which it corresponds is located in line between the lamp E and the light meter H. Accurate registry of the lenses with the apertures $f, f^1$ can be obtained through the provision of a small spring pressed detent adapted to engage in one or another of a series of recesses corresponding to the lenses and located around the disc in positions to cooperate with the detent when the corresponding lenses are in registry with said apertures.

The apparatus is designed to work from the ordinary house circuit and, since the lamps B and E are of a low voltage type, a transformer, in the case of A. C. current, or a potentiometer, in the case of D. C. current, is used for reducing the voltage across the lamps to the proper value. These devices can be located conveniently in the compartment at the rear of the partition $A^4$. In the circuit energizing the glare producing lamp B, it is desirable to include an ammeter J so that the current flowing through the lamp can be maintained at a given constant value. Obviously, since the intensity of the illuminating lamp E which renders the objects visible depends upon the relative brightness of the glare producing lamp B, whereas the intensity of the glare producing lamp does not enter at all into the measuring of the intensity of the illuminating lamp E by the light meter H, the interdependency between the two light sources on the one hand, and the independency therebetween on the other hand, requires that the glare producing lamp B be maintained at the same brilliance throughout all tests. The provision of the ammeter, together with a rheostat $J^1$ conveniently located at the back of the instrument and in the circuit of the glare producing lamp, will provide the necessary control. It has been found desirable to place a small lamp $E^4$ in series with the glare producing lamp B, and located outside the compartment A to serve as a ready indication that the lamp B (which, of course, is invisible to the operator) is working throughout the test. Before the actual test is commenced, the compartment is illuminated with the glare producing lamp extinguished and the subject shown one of the letters, say the letter L, to make sure that the head is properly positioned and that the location of the letters will be known. The lamp $E^4$ can be used to extinguish the lamp B merely by unscrewing it slightly from its socket.

The gradual control of the intensity of the illuminating lamp E can be maintained through the medium of a rheostat $E^3$ in circuit with said lamp, which rheostat can likewise be located at the back of the apparatus where it will be within the convenient reach of the operator. A reading of the light meter H will indicate whether or not the lamp E is properly working.

In order to prevent light from the glare producing source from reflecting from the top of the compartment into the eyes of the subject, there is provided a rearwardly and downwardly inclining shield $A^8$ for this purpose. The compartment A is also equipped at the bottom with a door $A^9$ which can be opened to give access to the interior of the compartment for replacing lamps when necessary and the whole apparatus is preferably mounted on an adjustable standard $A^{10}$ so that its height can be readily accommodated to the subject undergoing test.

As thus far described and except as hereinafter indicated, the apparatus is the same as that described in my prior patent previously referred to.

For simultaneously testing the eyes, the aperture $A^6$ is large enough to accommodate both eyes and the apparatus is equipped with an extended portion $A^7$ arranged to fit the subject so that when the face is placed close up to said extended portion, substantially all the light will be excluded at this point. When it is desired to test the eyes separately, the apparatus is fitted with the improved attachment M which consists of an eyepiece formed at the rear with a pair of spaced bosses $M^1$ which engage the edges of the larger aperture $A^6$ that is effective when the eyes are being examined simultaneously. The bosses $M^1$ act to locate the eyepiece on the longitudinal center line of the apparatus and at the top of the eyepiece there is located a snap fastener $M^2$ having cooperating portions on the eyepiece itself and upon the front wall of the compartment A which serve securely to hold the eyepiece in place. The eyepiece is formed with a single opening $M^3$ centrally located and from the opening there is a passageway $M^4$ extending rearwardly for a suitable distance, the opening flaring outwardly to a small degree. The degree of flare and the length of the passageway are so proportioned that the subject will have a restricted although unobstructed view of the objects E, H, L, N in the field.

When examining the eyes separately, the operator uses the technique previously described and which is the same as that followed when the eyes are being simultaneously examined.

In the accompanying drawings, the invention has been shown merely by way of example and in preferred form, and obviously many variations and modifications may be made therein which will still be comprised within its spirit. It is to be understood therefore, that the invention is not limited to any specific form or embodiment, except insofar as such limitations are specified in the appended claims.

Having thus described my invention, what I claim is:

1. Apparatus for determining an eyeglass lens to compensate for abnormal glare sensitiveness in a person and which includes, in combination, a compartment having a viewing aperture, a dazzle source of illumination in the compartment located in the line of vision of the person, object means in the compartment likewise in said line of vision but located so as not to obstruct the person's view of the dazzle source, means including a second light source for adjusting the illumination of the object means until the light reflected therefrom is sufficient to render the same visible to the person despite the presence of the dazzle source, a light meter for measuring the intensity of said second light source, and means for interposing lenses having different light absorbing properties between said second light source as adjusted and the light meter to determine a lens that will give a reading of the meter which is normal for the person undergoing test, said viewing aperture being located upon the longitudinal center line of the apparatus and sized to restrict the test to one eye of a person at a time.

2. In or for apparatus for determining an eyeglass lens to compensate for abnormal glare sensitiveness in a person and which has a compartment with a viewing aperture, a dazzle source of illumination in the compartment located in the line of vision of the person, object means in the compartment likewise in said line of vision but located so as not to obstruct the person's view of the dazzle source, means including a second light source for adjusting the illumination of the object means until the light reflected therefrom is sufficient to render the same visible to the person despite the presence of the dazzle source, a light meter for measuring the intensity of said second light source, and means for interposing lenses having different light absorbing properties between said second light source as adjusted and the light meter to determine a lens that will give a reading of the meter which is normal for the person undergoing test, an attachment arranged to be fitted into said viewing aperture and which presents a smaller viewing aperture located upon the longitudinal center line of the apparatus when the attachment is in place and sized to restrict the test to one eye of a person at a time.

HENRY R. HIGLEY.